March 30, 1948.  F. F. ROHRER, JR  2,438,683
FLUID PRESSURE CONTROL MECHANISM
Filed March 22, 1944  7 Sheets-Sheet 7

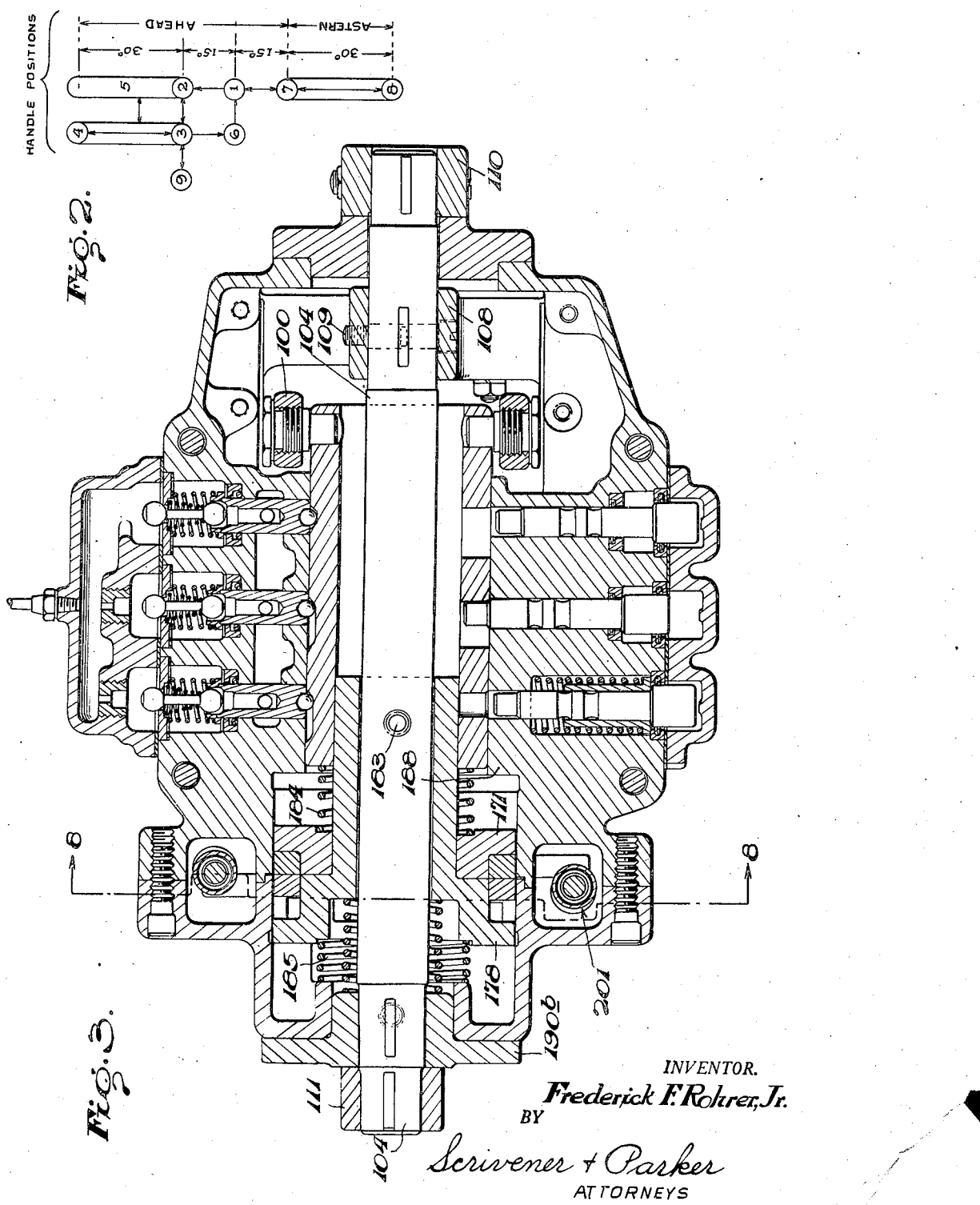

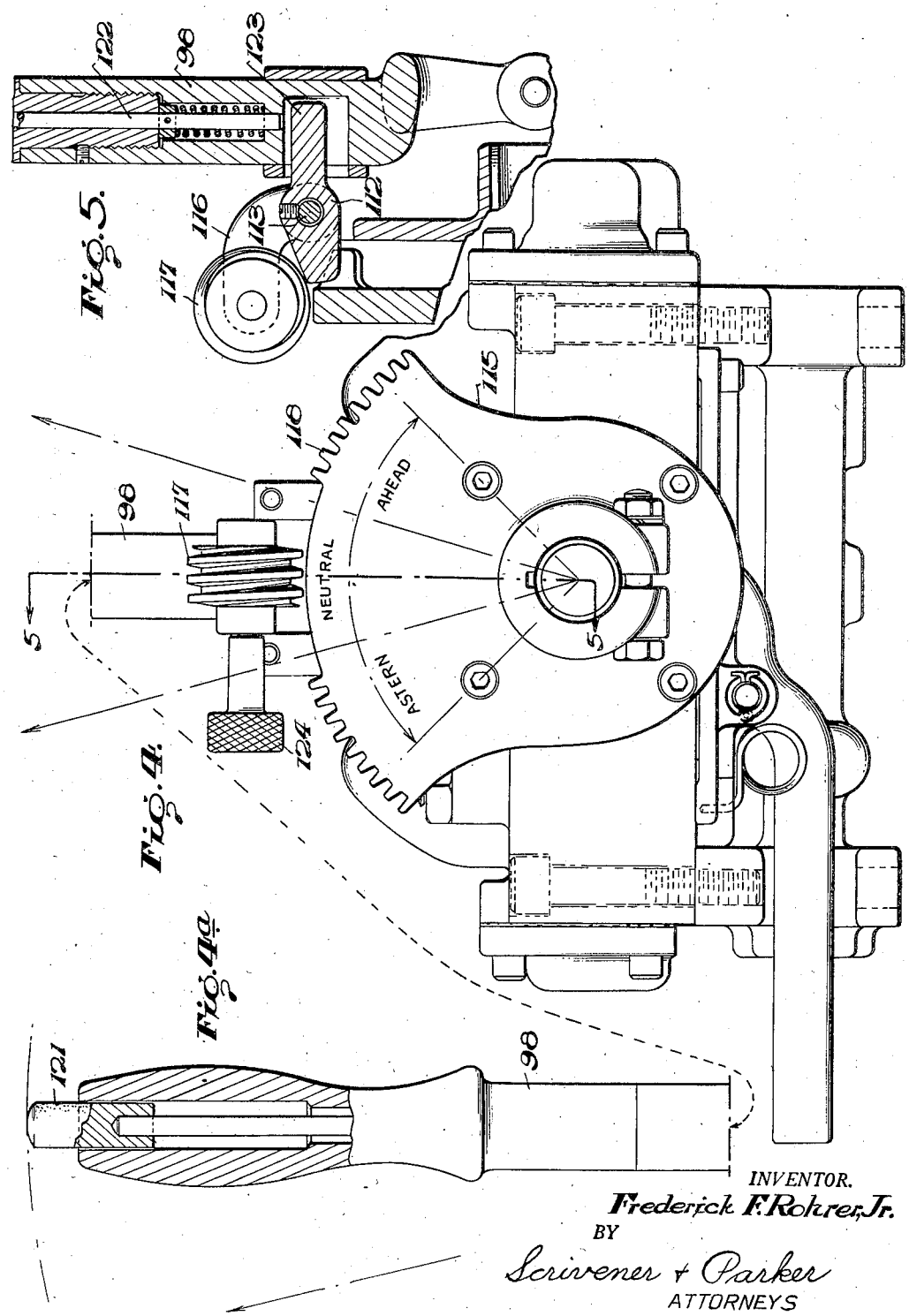

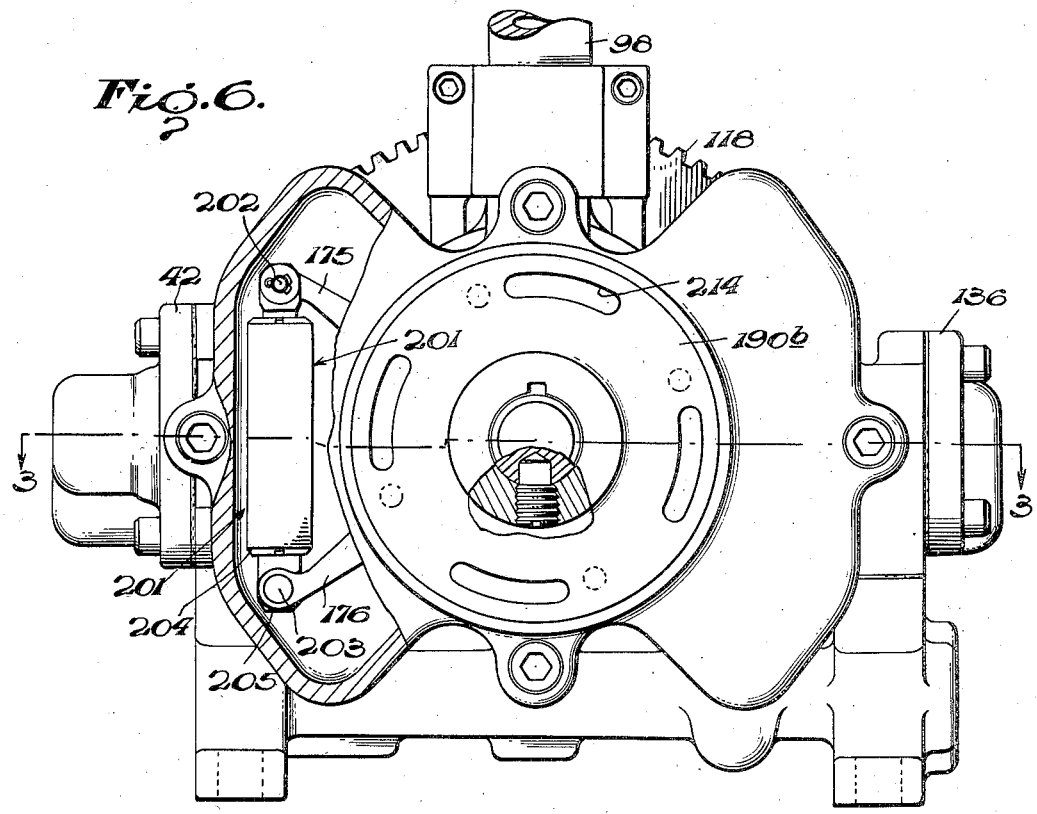
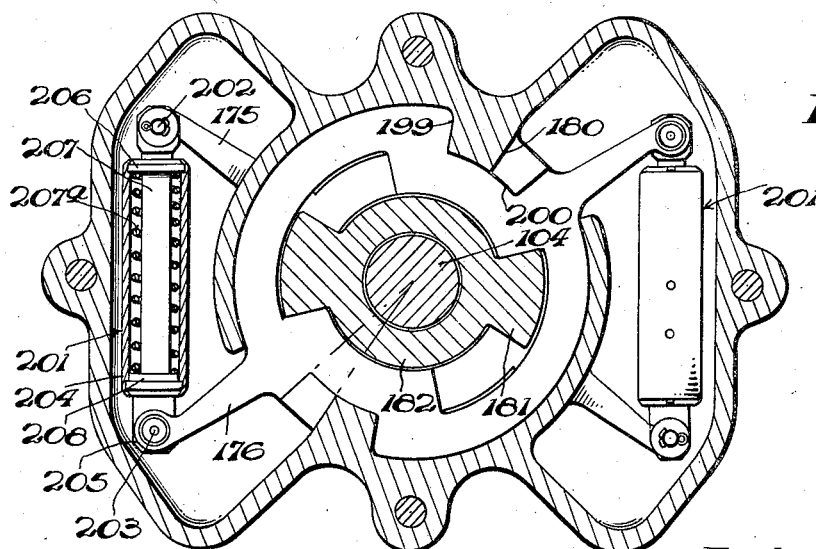

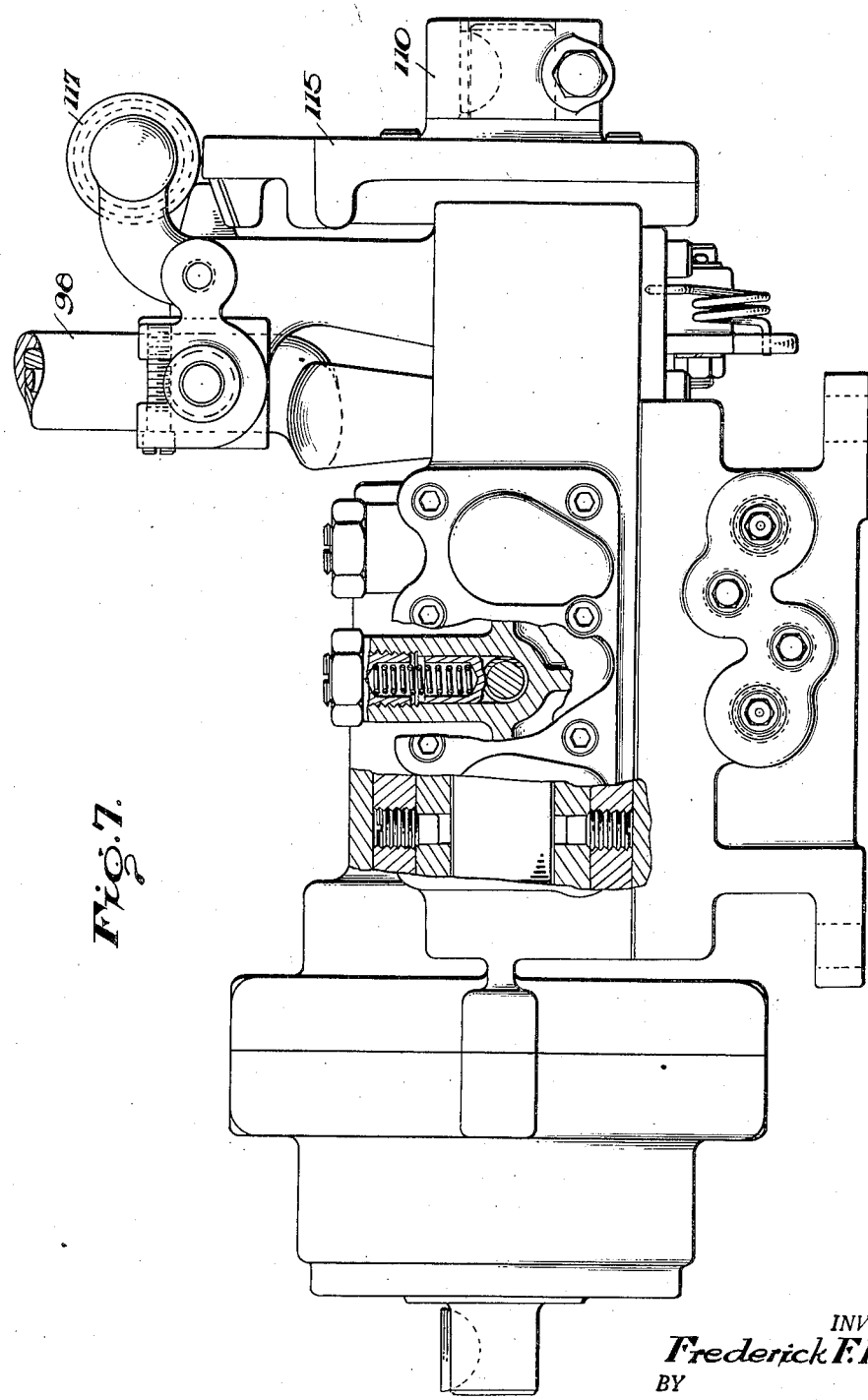

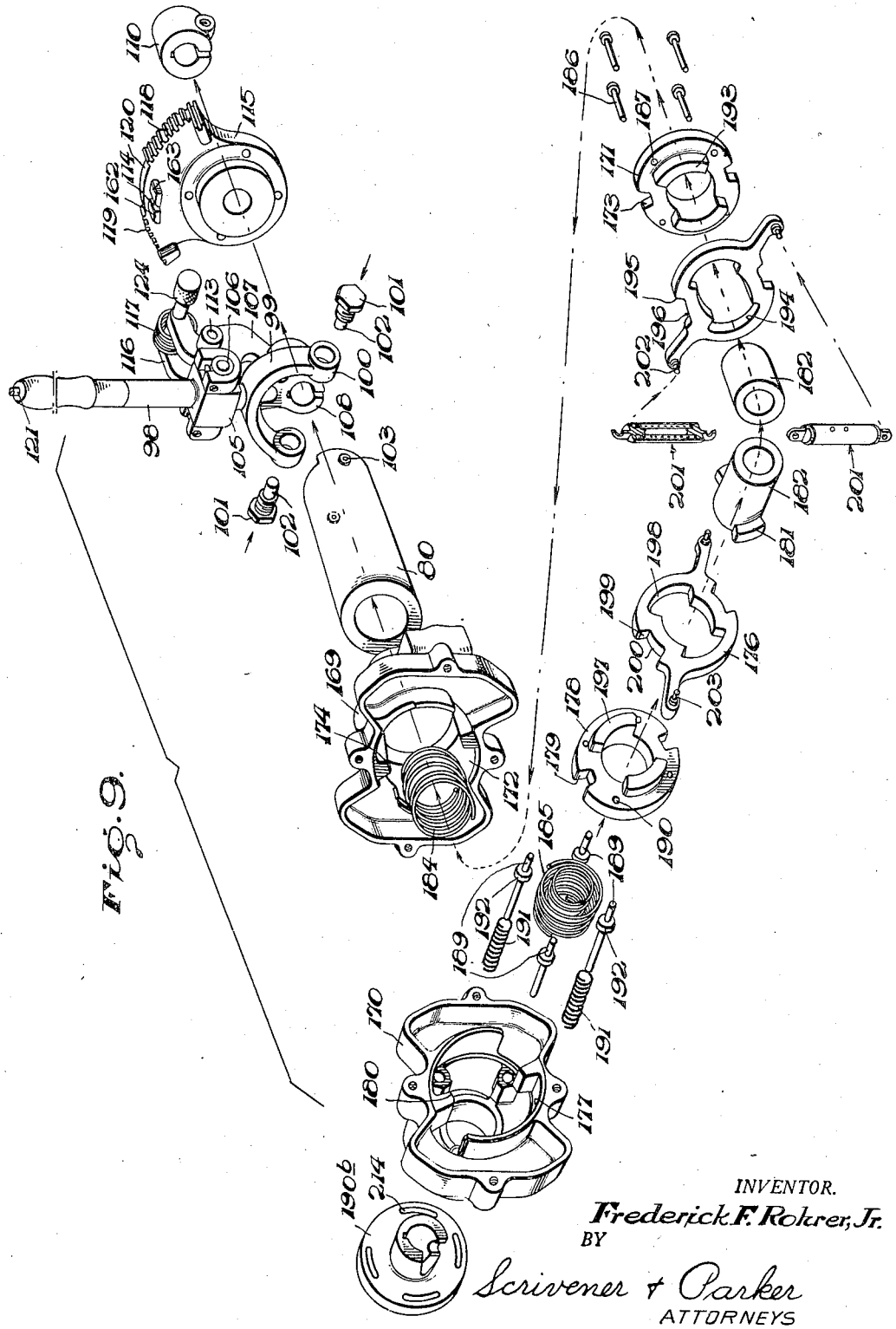

INVENTOR.
Frederick F. Rohrer, Jr.
BY
Scrivener & Parker
ATTORNEYS

Patented Mar. 30, 1948

2,438,683

UNITED STATES PATENT OFFICE 2,438,683

FLUID PRESSURE CONTROL MECHANISM

Frederick F. Rohrer, Jr., Philadelphia, Pa., assignor to Bendix-Westinghouse Automotive Air Brake Company, Elyria, Ohio, a corporation of Delaware Application March 22, 1944, Serial No. 527,649

32 Claims. (Cl. 192—.01)

This invention relates to fluid pressure control mechanism, and more particularly to mechanism for controlling the operation of a transmission for transmitting power from an engine to a device to be operated. It has previously been proposed to use forward and reverse transmissions of the type having inflatable tires for effecting a direct connection between the engine and the propeller in order to propel a vessel in a forward direction and also for operating as a brake to prevent rotation of one portion of a planetary transmission, of more or less conventional type, in order to reverse the direction of rotation of the propeller, but in some instances considerable difficulty has been experienced in so controlling the operation of these inflatable tires as to provide timed and synchronized operation in order to prevent unnecessary wear on the friction surfaces of the tire, and it is accordingly an object of the present invention to provide, in connection with a transmission of the above type, control mechanism for properly synchronizing and timing the application of fluid pressure to the tires for inflating the same.

The construction of a transmission of the above type is such that the inflatable tire which acts as a clutch to provide a direct drive to the propeller for forward motion of the vessel rotates with the engine-driven portion of the propeller shaft, and it is accordingly necessary to provide sealing means in order that fluid pressure may be supplied through said sealing means to the rotating tire. In order to prevent excessive wear on the seal, means have also been provided for automatically retaining the fluid pressure in the tire when inflated and for relieving the pressure on the seal when the forward clutch is engaged, and it is accordingly a further object of the invention to provide novel control means for controlling the application of fluid pressure to the tire through the automatic retaining means, as well as for controlling the release of fluid pressure from the sealing means after the tire has been inflated, this necessitating a synchronizing or timing action in order to insure that the tire is fully inflated prior to release of pressure from the sealing means in order to prevent undue slipping and consequent wear of the clutch.

Since the inertia of the rotating parts has a substantially high value, it is also desirable to so synchronize and control the application of fluid pressure to the tires, when the control is operated to change the direction of rotation of the propeller shaft, as to automatically prevent engagement of one of the clutches until such time as the other clutch is fully disengaged, and mechanism for accomplishing this desirable end is contemplated by the present invention.

It is further desirable that the construction be such that the operator be permitted to control the operation of the clutches in the transmission as well as the speed of the engine by means of a single control lever, and it is accordingly a further object of the invention to provide means controlled by a single lever for controlling the inflation of the clutch tires to provide forward or reverse operation, and at the same time to provide for controlling the degree of throttle opening by the same lever in such a manner as to prevent the operator from opening the throttle to materially increase the speed of the engine until such time as the tire in the operative clutch has been sufficiently inflated to avoid all possibility of slipping and consequent wear.

Yet another object of the invention is to provide simple and efficient means for controlling the operation of the transmission and the operation of the throttle valve of the engine with which the transmission is associated by means of a single operator's control element, so constituted as to automatically prevent the possibility of serious damage to the transmission due to improper operation of the control means by the operator.

Other objects and novel features of the invention will appear more fully hereinafter from the following detailed description when taken in connection with the accompanying drawings, illustrative of one embodiment of the invention. It is to be expressly understood, however, that the drawings are utilized for purposes of illustration only and are not designed as a definition of the limits of the invention, reference being had for this latter purpose to the appended claims.

In the drawings, wherein similar reference numerals refer to like parts throughout the several views;

Fig. 2 is a diagrammatic view illustrative of the various operative positions of the operator's control element;

Fig. 3 is a sectional top view of the control unit;

Fig. 4 is an end view of the control unit including a portion of the operator's control lever;

Fig. 4a is a view, partially in section, of the upper end of the control lever;

Fig. 5 is a side view, partially in section, showing a portion of the control lever and its associated mechanism;

Fig. 6 is a view, partially broken away, taken from the other end of the control unit;

Fig. 7 is an elevation, partially in section, of the complete control unit;

Fig. 8 is a view, partially in section, taken along line 8—8 of Fig. 3;

Fig. 9 is an exploded view, partially in section, illustrative of the relationship of the various parts of the unit, the central operating shaft having been omitted in the interest of clarity;

Figure 1:
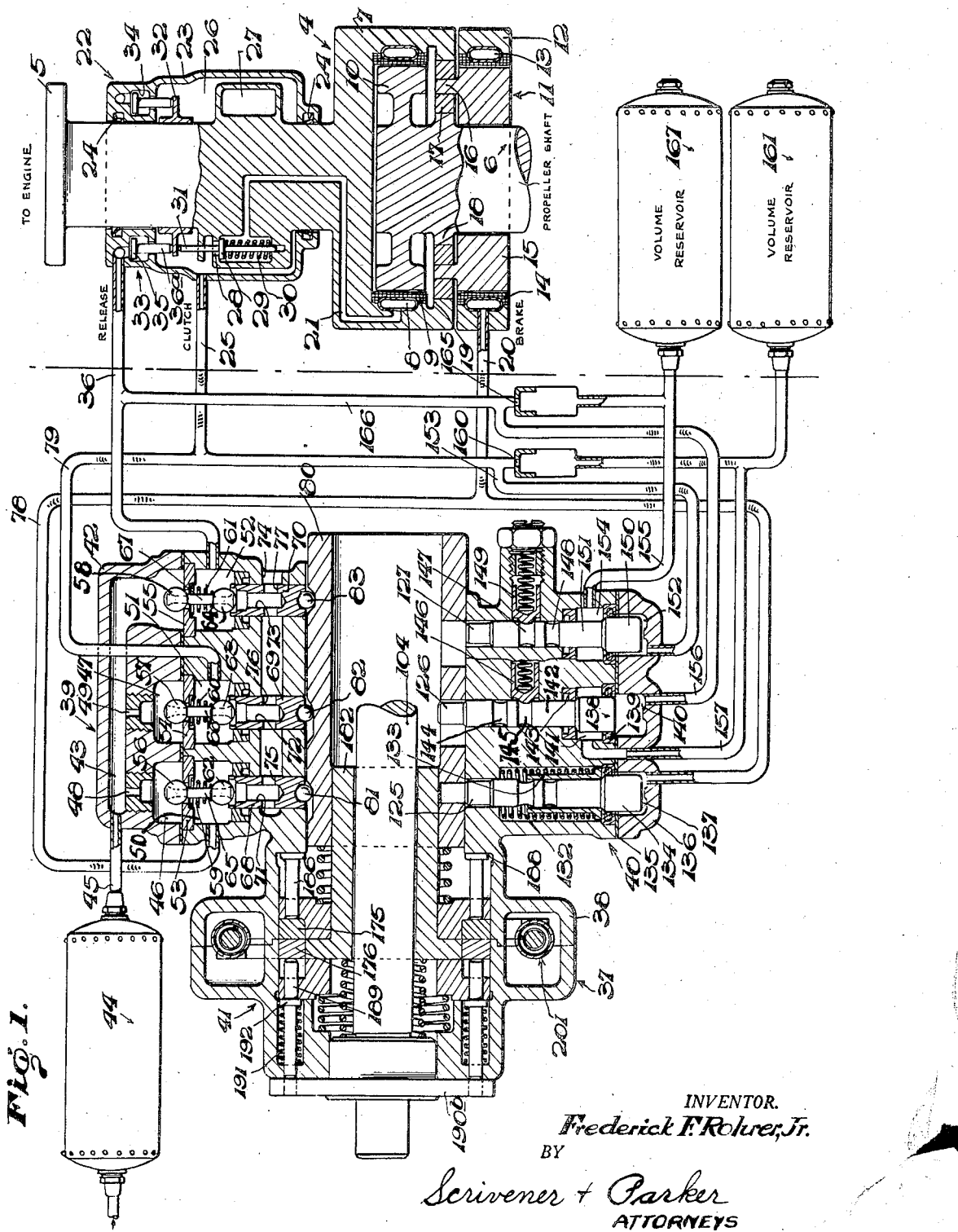
Fig. 1 is a diagrammatic view, partially in section, of a transmission of the above type and the necessary control mechanism therefor.

Referring more particularly to Fig. 1, the system illustrated includes a forward and reverse transmission 4 having a shaft 5 driven by the engine and a shaft 6 which is connected to the propeller of the vessel. The lower end of the shaft 5 is provided with a drum 7, the interior of the drum having attached thereto an inflatable tire 8 provided with attached brake shoes 9 adapted on inflation of the tire to contract in order to engage the outer surface of a brake drum 10 formed on the upper end of the propeller shaft 6, this action serving to establish a driving connection between the shafts 5 and 6 in order to permit operation of the propeller. Planetary reversing mechanism 11 is also provided adjacent the upper end of the shaft 6 and includes a ring-like member 12 held at all times against rotation by means of a suitable mounting on the vessel, not shown, and provided with an inflatable tire 13 having suitable brake shoes 14 adapted on inflation of the tire to engage a ring member 15 mounted for rotation about the shaft 6 and provided at its upper end with a plurality of gear shafts 16 on which gears 17 are rotatably mounted as shown. These gears are in engagement respectively with a gear portion 18 formed on the shaft 6 and an internal ring gear 19 formed on the member 7, and it will be readily understood by those skilled in the art that when the drum 10 is disengaged by the brake shoes 9 and the drum 15 is engaged by the brake shoes 14 in such a manner as to prevent rotation of the drum 15, power will be transmitted from the member 7 to the shaft 6 through the gears 19, 17 and 18, in order to effect reverse rotation of the shaft 6.

In order that fluid pressure may be supplied to inflate tires 13 and 8, a conduit 20 is connected with the tire 13, while a passage 21, formed in the shaft 5 and in the portion 7 thereof, serves to supply fluid pressure to the tire 8. Since the shaft 5 and the drum 7 are rotating at all times when the engine is running, it is necessary to provide sealing means in order to permit the flow of fluid pressure from a stationary conduit to the passage 21, and such sealing means is provided in the form of a sealing unit 22 having a casing 23 surrounding the shaft 5 and permitting rotation of the shaft therein, the casing being provided at either end with sealing rings 24 in order to prevent the escape of fluid pressure from the interior of the casing along the shaft. The casing 23 is held against rotation by any suitable means, not shown, and is adapted to be supplied with fluid pressure through a conduit 25 connected with a chamber 26 formed in the casing. An annular chamber 27 is formed on the shaft 5 and is connected with the passage 21, the chamber being adapted to receive fluid pressure from the chamber 26 in the casing 23 through a port 28 formed in the upper wall of the annular chamber. The inner end of the port 28 is normally closed by means of a valve 29 maintained against the end of the port by means of a spring 30 interposed between the valve and the wall of the casing, the valve being provided with an upwardly extending stem 31 adapted for actuation by means to be described hereinafter. The tension of the spring 30 is preferably so chosen as to permit the passage of fluid pressure from the chamber 26 to the chamber 27 whenever the pressure in the chamber 26 exceeds that in the chamber 27 by a small value, the result being that fluid pressure supplied to the casing 23 through the conduit 25 passes the valve 29 and is conducted to the tire 8 through the conduit 21, the escape of pressure from the tire being prevented, however, by the operation of the valve 29 which acts as a check valve for this purpose. In the event it is desired to release fluid pressure from the tire 8, fluid pressure operated means are provided for moving the valve to open position, such means including a collar 32 slidably mounted on the shaft 5 and adapted on downward movement to engage the stem 31 of the valve in order to move the latter to open position, together with a fluid motor 33 positioned in the upper end of the casing 23 and including an annular cylinder 34 having a piston 35 slidably mounted therein and adapted on application of fluid pressure to the upper end of the cylinder through a conduit 36 connected thereto to move downward to the lower end of the cylinder. The piston is also provided with downwardly extending stems 36a adapted to engage the upper side of the collar 33, it thus being apparent that on downward movement of the piston under the action of the fluid pressure supplied to the cylinder through the conduit 36, the collar is moved downward, and by virtue of its engagement with the stem 31 of the valve 29, serves to move the latter to open position in order to permit the escape of fluid pressure from the tire 8 into the chamber 26 through the passage 21, the annular chamber 27 and the open valve 29.

A unit for controlling the flow of fluid pressure to and from the tire 13 and the chamber 26 through the conduits 20, 25 and 36 is indicated generally in Fig. 1 by the numeral 37, and it is to be understood that the positioning of the unit shown in this figure is diagrammatic for the purpose of showing the essential mechanism of the unit, and is not to be directly compared with the similar showing of the unit which appears in Fig. 3. As illustrated in Fig. 1, a casing 38 of the unit is provided on one side with a control valve unit 39, and on the lower side with a detent or timing unit 40, the left end of the casing containing a sequence controlling mechanism 41 for controlling the sequence of operation of the valves in the unit 39 by the operator.

The valve unit 39 includes a casing portion 42 having an inlet chamber 43 adapted to be supplied with fluid pressure from a suitable reservoir 44 through a conduit 45. The casing portion is also provided with auxiliary inlet chambers 46 and 47 connected respectively with the inlet chamber 43 by means of restricted passages 48 and 49 for reasons to be hereinafter described. The valve unit is also provided with outlet chambers 50, 51 and 52, and these chambers are separated from the chambers 46, 47 and 43, respectively, by means of ported partitions 53, 54 and 55, communication being normally prevented between the respective chambers by means of inlet valves 56, 57 and 58, which are normally maintained in the position shown by means of springs 59, 60 and 61 interposed between the lower surfaces of the partitions and the upper surfaces of exhaust valves 62, 63 and 64, the latter being connected with the respective inlet valves by means of stems 65, 66 and 67. Operation of the above valves is selectively accomplished by means of plungers 68, 69 and 70 slidably mounted in the casing portion in substantial alignment with the corresponding valves, and these plungers are provided with bores 71, 72 and 73 adapted at their upper ends to communicate respectively with outlet chambers 50, 51 and 52, and adapted to communicate with an atmospheric passage 74 formed in the casing portion through ports 75, 76 and 77 formed in the respective plungers. The outlet chamber 50 is connected with the conduit 20 through a conduit 78, the outlet chamber 51 being connected with the conduit 25 through a conduit 79 and the outlet chamber 52 being connected to the conduit 36. It will thus be apparent from the foregoing description that the intake and exhaust valves above described in cooperation with their operating plungers serve to control the flow of fluid pressure in the conduits 20, 25 and 36 in order to control the application and release of pressure to and from the tires 13 and 8.

Figure 10:
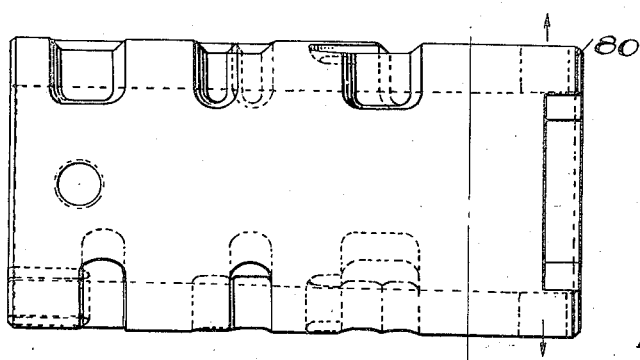
Fig. 10 is a view of the cam operated by the control lever.

Operation of the valve operating plungers 68, 69 and 70 is accomplished by means of a cam 80 which is slidably and rotatably mounted in the casing 38, the cam being so constructed that the plungers, which are provided at their lower ends with follower balls 81, 82 and 83, may be selectively operated in the proper sequence by rotating and sliding movement of the cam. The construction of the cam is more fully illustrated in Fig. 10 and in the developed view in Fig. 11, the slots designated generally as 84, 85 and 86 being normally in engagement with the corresponding balls when the control mechanism is in neutral position. When the parts are in neutral position, the centers of the valve plungers are in alignment with a line 87 indicated on Fig. 11, and it is to be understood that when the cam is rotated in a clockwise direction, as viewed from the right end of the control unit as illustrated in Fig. 1, the movement of the cam will be such that the slots 84, 85 and 86 are moved upward with respect to the line 87 in Fig. 11. The lines 88, 89 and 90 in Fig. 11 also indicate the neutral relationship of the center lines of the plungers with respect to the cam when the parts are in neutral position, and it is therefore apparent that with the parts in this position, the center lines of the plungers 81, 82 and 83 will pass through the intersection of the line 87 with the lines 90, 89 and 88, respectively. Thus on rotation of the cam in a clockwise direction the ball 82 will engage a cam surface 91 formed in the wall of the slot 85, the result being that the plunger 69 will be raised to engage the exhaust valve 63 in order to prevent communication between the outlet chamber 51 and the exhaust passage 74, and to subsequently open the inlet valve 57 in order to permit communication between chambers 47 and 51. Thus fluid pressure will be supplied to the chamber 26 of the unit 22 through conduits 79 and 25, and thence to the tire 8 through the path heretofore described which includes the check valve 29, and in view of the construction of the cam slots 84 and 86, initial movement of the cam in a clockwise direction will not actuate the plungers 68 and 70. Thus pressure will be supplied to the chamber 26 of the unit 22 and to the tire 8, and this pressure will be maintained in the chamber 26 by the valve 29 until further movement of the cam takes place. The cam may be maintained in the position above described until the tire 8 is fully charged with fluid pressure, and since it is desirable to relieve the pressure from the chamber 26 in order to prevent undue wear of the seals 24 when the tire is fully charged, the cam is then moved axially to the right, without rotation, by means of a suitable connection with the operator's control lever, to be later described, whereupon the ball 82 enters a portion 92 of the cam slot 85, permitting the plunger 69 to move downward to close the inlet valve 57 and open the exhaust valve. When this action occurs, fluid pressure is exhausted from the chamber 26 through conduits 25 and 79, outlet chamber 51, bore 72, port 76 and exhaust passage 74. Through mechanism not shown, and forming no part of the present invention, the operating mechanism for the cam 80 is connected with the throttle valve of the engine through a suitable lost motion connection in such a manner that the throttle valve is maintained in closed position during rotation of the cam a predetermined angle in either direction from neutral position, this angle being so chosen with respect to the clockwise rotation of the cam previously described, as to permit operation of the valve plunger 69 and its associated valve mechanism to fully charge the tire 8 prior to operation of the throttle valve to increase the speed of the engine. Since, as above described, the cam has been moved axially to the right in order to permit the ball 82 to engage the portion 92 of the slot 85, it will be apparent that on further rotation of the cam in a clockwise direction without further axial movement, all three of the valve operating plungers will remain in the downward position shown by virtue of the fact that the balls 81, 82 and 83, respectively, are in engagement with recessed portions 93, 92 and 94 of the slots 86, 85 and 84. Thus during this range of cam movement, the throttle valve may be moved from idling to full open position and back to idling position without effecting operation of any of the control valve mechanism.

Figure 11:
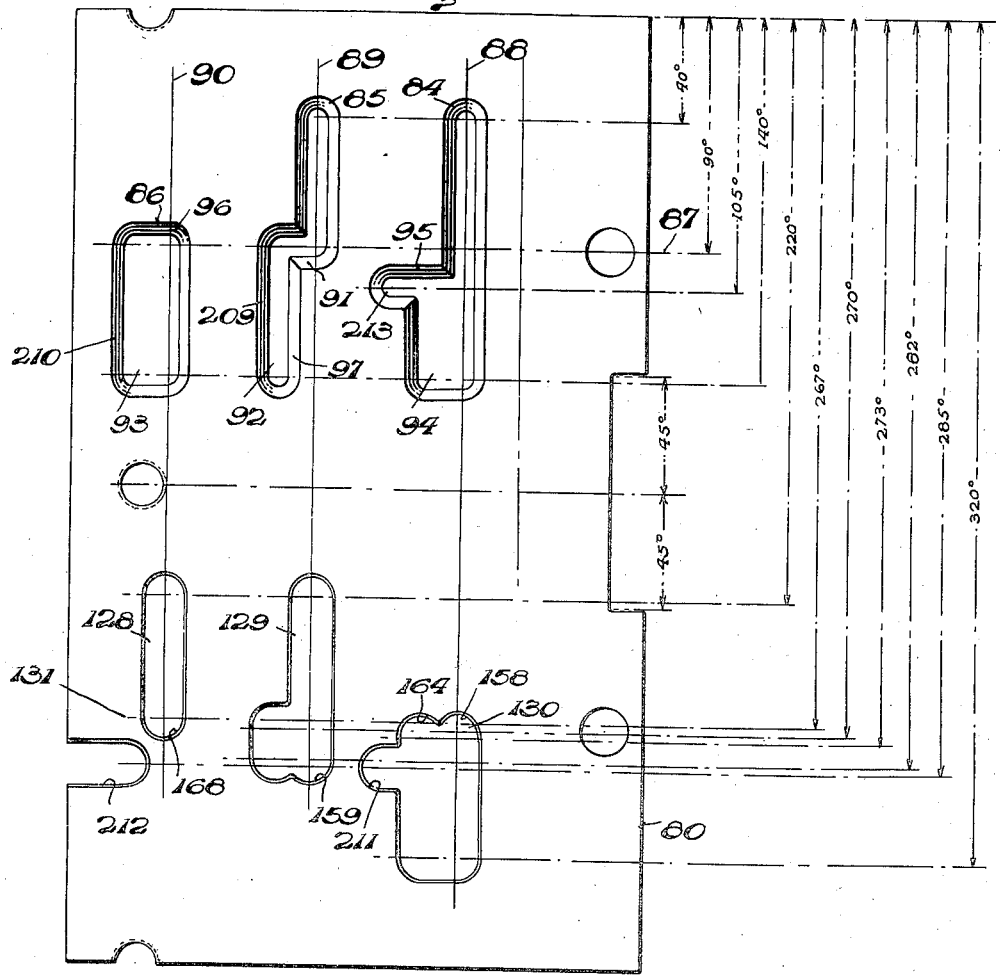
Fig. 11 is a developed view of the cam shown in Fig. 10.

Release of fluid pressure from the tire 8, with the cam in the position last described, is accomplished by rotating the cam in a counterclockwise direction toward neutral position without longitudinal movement thereof, and since the cam in the above position has already been moved to the right with respect to the line 88 shown in Fig. 11, rotation of the cam toward neutral position will cause the ball 83 to engage the cam surface 95 of the slot 84 in order to raise the plunger 70 during the last portion of the cam rotation toward neutral position. When the plunger is raised, the exhaust valve will close the bore 73 to prevent communication between the chamber 52 and atmosphere, and the inlet valve will be opened to permit communication between the inlet chamber 43 and outlet chamber 52, whereupon fluid pressure will be supplied to the cylinder 34 through the conduit 36 in order to actuate the piston 35 to move the collar 32 and the valve stem 31 downward to open the valve in order to connect the passage 21 with the chamber 26. Since the plunger 69 is in a downward position during this operation, the fluid pressure thus released to the chamber 26 from the tire 8 will be exhausted to atmosphere through conduit 25, conduit 79, outlet chamber 51, bore 72, port 76, and exhaust passage 74, thus dis-establishing the connection between the shaft 5 and the propeller shaft 6.

In the event it is now desired to inflate the tire 13 in order to lock the ring 15 to provide for reverse rotation of the shaft 6, the cam, which has already been rotated to neutral position, is moved axially to the left by the operator to its original position along this line, and is then rotated from neutral position in a counterclockwise direction without longitudinal movement. As soon as this action occurs, the ball 81 is engaged by a cam surface 96 formed in the cam slot 86 and the plunger 68 is moved upward to close the exhaust valve 62 and to open the intake valve 56 in order to connect inlet chamber 46 with outlet chamber 50. Since this outlet chamber is connected with the tire 13 through conduits 76 and 20, fluid pressure is supplied to the tire to inflate it in order to cause the brake lining 14 to engage the surface of the member 15 to lock the latter in a stationary position. Since the ring 12 is stationary at all times, as heretofore stated, no special sealing means is necessary in connection with the operation of the reverse portion of the mechanism and no separate releasing means is therefore necessary in order to release fluid pressure from the tire, it only being necessary for the operator to again rotate the cam in a clockwise direction to neutral position in order to permit downward movement of the plunger 68 to permit closing of the inlet valve 56 and opening of the exhaust valve 60. When the exhaust valve is again opened in this manner, fluid pressure is exhausted through conduits 20 and 76, outlet chamber 50, bore 71, ports 75 and exhaust passage 74.

As heretofore stated in connection with the operation of the valve plunger 72 by clockwise and subsequently longitudinal movement of the cam to first charge the tire 8 for further operation and to subsequently release fluid pressure from the chamber 26 in the unit 22 in order to prevent undue wear on the seals 24 during operation of the vessel in forward speed, the ball 82 engages the depressed portion 92 of the slot 85 regardless of further rotation of the cam in a clockwise direction to increase the degree of opening of the throttle valves to increase the speed of the engine. During long periods of operation of the vessel with the forward speed engaged, however, it is possible that some leakage may occur from the tire 8 which would result in slipping of the clutch, and in the event this action occurs, it is only necessary for the operator to momentarily move the cam longitudinally to the left in order to recharge the tire, this action occuring by virture of the engagement of the ball 82 with a cam portion 97 formed in the cam slot 85. This type of operation permits the operator to recharge the clutch at will and, as will be more fully described hereinafter, means are provided to prevent the cam from being maintained in this position and to prevent pressure from being maintained in the chamber 26 except as a result of deliberate action to that end on the part of the operator.

In order that the sequence of operation of the operator's control element and of the cam may be more fully understood, reference is had to Fig. 2 of the drawing illustrating the various operating positions which may be occupied by the element. As shown in the drawing, the element ordinarily occupies position 1, and during movement from position 1 to position 2 serves to operate the plunger 69 and its associated valve mechanism, in order to charge the tire 8 to obtain forward speed. When the control element is moved to position 2, the tire is fully charged and on subsequent movement of the element from position 2 to position 3, the cam is moved to permit downward movement of the plunger 69 to the position shown in Fig. 1, in order to permit the release of fluid pressure from the chamber 26 as heretofore described, the fluid pressure in the tire 8 being retained therein by the action of the check valve 29. Thus with the element in position 3, the tire is fully charged and fluid pressure has been released from the chamber 26. The lost motion connection to the throttle valve of the engine, not shown, is such that with the element in positions 1, 2 or 3, the throttle valve is maintained in idling position, while on subsequent movement of the element between positions 3 and 4 the degree of opening of the throttle valve may be adjusted from idling position to full open position in order to fully control the speed of the engine. When the control element is in any position between positions 3 and 4, it may be moved to the right to the position designated as 5 in order to operate the valve mechanism to recharge the tire 8 as heretofore described. Movement of the element from position 3 to position 6 results in upward movement of the plunger 70 to actuate the release valve mechanism to supply fluid pressure to the cylinder 34 to actuate the check valve 29 to release fluid pressure from the tire 8 in order to disengage the forward speed. The release of fluid pressure from the cylinder 34 may then be accomplished by moving the element from position 6 to position 1, this resulting in movement of the cam to the left. When this action occurs, the ball 83 engages the slot 84 and allows the plunger 70 to drop downward to the position shown in Fig. 1 in order to initiate the exhausting action of fluid from the cylinder 34.

For the purpose of explaining more fully the rotational and axial movement of the cam obtained by movement of the operator's control element, reference is had to Figs. 7 and 9 of the drawings, wherein a lever 98 is provided for controlling the operation of the cam. The lower end of the lever is provided with a forked portion 99 provided with bosses 100 adapted to threadedly receive studs 101 having reduced end portions 102 adapted for engagement with bores 103 formed and oppositely disposed at the right end of the cam. This pivotal connection serves to support the lower end of the lever and in order that the lever may also impart rotation to a throttle valve controlling shaft 104 mounted for rotation in the control unit as shown more particularly in Fig. 3, the portion of the lever above the fork 99 is slidably mounted in a block 105, the block being pivotally mounted by means of a pin 106 on a bracket member 107 having a hub portion 108 keyed to the shaft 104 and restrained against endwise movement with respect to the shaft by means of a suitable pin 109, it being noted that the shaft 104 is restrained from endwise movement in the casing by means of suitable collars 110 and 111 suitably mounted on either end, one of which may be connected to the lost motion mechanism for operating the throttle valve. Thus movement of the lever in one plane results in rotation of the shaft and cam, while movement of the lever in a direction at right angles to the above plane results in longitudinal movement of the cam, due to the fact that the block 105 and member 107 are prevented from longitudinal movement by the means above described. The lever may be normally maintained in neutral position against rotation by means of a latch 112 pivotally mounted on the bracket 107 by means of a pin 113, the latch being adapted when the lever is in neutral position to engage a notch 114 formed on the left face of an end plate 115 which is bolted to the right end of the casing. The latch 112 is also provided with an extending lever arm 116 having a worm 117 rotatably mounted transversely thereof and adapted to engage toothed worm gear segments 118 and 119 formed on the end plate 115 as shown. A space 120 is provided on the periphery of the member 115 between the toothed sections 118 and 119 in order to allow the lever to travel through a predetermined arc on either side of neutral position without the worm 117 engaging the teeth on the member 115, this arc representing the movement required on the part of the lever 98 in order to fully control the operation of the fluid pressure control valves previously described without moving the throttle valve from idling position. On movement of the lever through a greater arc in either direction, the worm may be raised to permit such movement by means of a plunger 121 slidably mounted in the top of the lever and provided with a downwardly extending rod 122 which serves on downward movement to engage a lever arm 123 formed on the detent 112, it thus being possible for the operator to control engagement and disengagement of the detent as well as engagment and disengagement of the worm 117 with the toothed sections 118 and 119. When the lever is moved into the throttle controlling range, the lever may be maintained in any desired position by this engagement of the worm 117 with the toothed sections, and in the event any fine adjustment of the throttle valve position is necessary, the operator may accomplish such adjustment without moving the lever by rotating the worm through the medium of an attached adjusting knob 124.

The sequence of operation of the control lever and of the attached cam 80, which operates the control valve mechanism, is extremely important, since it is essential, as heretofore stated, that the clutches be fully charged with fluid pressure in order to prevent slipping before the lever is advanced sufficiently to open the throttle valve to materially increase the speed of the engine. It is also necessary to provide means for preventing the engagement of the reverse clutch prior to complete release of the forward clutch, and the same is true in the event it is desired to engage the forward speed clutch after release of the reverse clutch, and the timing mechanism 40 is accordingly provided as more particularly shown in Fig. 1 of the drawings, for the purpose of insuring proper operation of the lever by the operator for the purpose of preventing abuse of the transmission mechanism. This timing or detent mechanism includes detents 125, 126 and 127 arranged as shown and slidably mounted in the casing 38, the upper ends of these detents being adapted at various times to respectively engage slots 128, 129 and 130 formed on the opposite side of the cam from the slots 84, 85 and 86. With the control lever in neutral position, the vertical center lines of these detents intersect along a line 131 indicated in Fig. 11 of the drawing, and the detents are in the position shown in Fig. 1, the detents 125 and 127 being disengaged from the cam slots and the detent 126 being in engagement with the slot 129. With respect to axial movement of the cam, the center lines of the detents intersect the lines 90, 89, and 88 indicated in Fig. 11. The detent 126 is normally maintained in the position shown by means of a spring 132 interposed between the casing and a sleeve 133 carried by the detent, the lower end of the detent being provided with a piston portion 134 slidably mounted in a sealing element 135 mounted in the housing. A cover member 136, suitably bolted to the casing, forms, in connection with the piston portion 134, a chamber 137 which may be subjected to fluid pressure by virtue of its connection with the conduit 78, which is connected to the tire 13 by means of the conduit 20. Thus the detent is normally maintained out of engagement with the slot in the cam and may be forced upward to engage the cam against the force exerted by the spring 132 when fluid pressure is supplied to the chamber 137. The detent 126 is likewise provided with a piston portion 138 slidably mounted in a seal 139 and subjected at its lower end to the fluid pressure in a chamber 140 formed by the cover plate and at its upper end to the fluid pressure in an annular chamber 141, a portion 142 of the detent, of reduced diameter, being slidably mounted in a seal 143 in order to provide a differential diameter piston. The detent is likewise provided with upper and lower detent grooves 144 and 145 adapted to be engaged by a spring-pressed detent 146 mounted in the casing, and shown out of position in Fig. 1 in the interest of clarity. Thus the detent 146 tends to maintain the plunger 126 either in the position shown or in a downward position wherein the upper end of the plunger is out of engagement with the cam. The plunger 127 is likewise provided with detent receiving grooves 147 and 148, and a spring-pressed detent 149 slidably mounted in the casing is adapted to engage one or the other of these grooves in order to maintain the plunger in the position shown in Fig. 1 or to maintain the plunger in an upward position in engagement with the cam slot 130. The plunger 127 is provided with relatively large and small piston sections 150 and 151, these portions forming, in connection with the casing and suitable seals, a chamber 152 connected with the conduit 79 by means of a conduit 153, and an upper chamber 154 having a conduit 155 connected thereto. It is also noted that chambers 140 and 141 adjacent the piston portion of the plunger 126 are adapted to be supplied with fluid pressure by conduits 156 and 157 respectively. The cam slot 130 is provided with a portion 158 so shaped that it is impossible for the upper end of the plunger 127 to enter the cam slot until the cam has been rotated through a slight angle in a clockwise direction in order to operate the valve plunger 69.

In the event the operator is desirous of charging the tire 8 in order to engage forward speed, the lever is operated to rotate the cam in a clockwise direction without axial movement whereupon as previously explained the plunger 69 is lifted by the cam in order to operate the associated valve mechanism in order to supply fluid pressure to the sealing unit 22 and to the tire through the conduits 79 and 25. The conduit 79 is connected with the conduit 153 leading to the chamber 152 below the plunger 127 and the plunger is consequently forced upward into engagement with the cam slot in response to the action of the fluid pressure on the piston portion 152 and since as previously explained it is impossible for the upper end of the plunger to enter the cam slot prior to slight clockwise movement of the cam, the subsequent movement of the plunger into engagement with the cam slot makes it impossible for the operator to again return the control lever and cam to neutral position in order to exhaust fluid pressure from the unit 22, the purpose of this arrangement being to render it impossible for the operator to partially charge the tire 8 and then release fluid pressure therefrom by reverse movement of the lever to neutral position, a procedure which might result in undue slipping and excessive wear of the forward speed clutch. Thereafter the plunger 127 is maintained in upward position by the operation of the detent 149 until such time as fluid pressure is exhausted from the chamber 152 and admitted to the chamber 154. During the above type of operation, the plunger 126 is maintained in engagement with the cam groove 129 by means of the detent 146, and the cam groove is provided with a portion 159 so positioned as to engage the upper end of the plunger 126 in order to limit angular movement of the cam in a clockwise direction by a predetermined amount, the purpose of this arrangement being to insure complete charging of the clutch tire 8 prior to further operation of the control lever. As stated heretofore, the upper chamber 141 associated with the plunger 126 is connected with a conduit 157, and the latter conduit is connected as shown with the lower portion of the conduit 79, a restricted passage 160 being interposed in the conduit in order to delay the application of fluid pressure to the conduit 157. In order to further delay the build-up of pressure in the latter conduit, the lower end of the conduit 79 is connected with a volume reservoir 161, the result being that on operation of the plunger 69 to operate the valves to charge the tire 8, fluid pressure is supplied through the channel above described to the chamber 141 but due to the action of the restricted passage 160 and the volume reservoir 161 which is supplied thereby, the build-up of pressure in the chamber 141 is delayed sufficiently to prevent the application of this pressure from forcing the plunger 126 downward and out of engagement with the cam slot 129 and the portion 159 thereof until such time as the tire 8 has been fully charged with fluid pressure. As the pressure increases in the chamber 141, however, the plunger is forced downward, thus disengaging the upper end of the plunger from the portion 159 of the cam slot and permitting further rotation of the cam in a clockwise direction. By means of mechanism to be more fully described hereinafter, axial movement of the cam to the right is prevented until such further rotation of the cam is permitted by release movement of the plunger 126. Thereupon, the lever may be rocked to the left in order to move the cam axially to the right, this action resulting in downward movement of the plunger 69 and release of fluid pressure from the unit 22 as well as from the chamber 141 through the paths previously described. The lever may then be moved directly into position 3, and the operator is free to thereafter move the lever to any point between positions 3 and 4 in order to control the degree of opening of the engine throttle valve through the suitable lost motion connecting mechanism provided. Operation of the button 121 on the control lever 98 permits the operator to engage or disengage the worm 117 from the gear teeth on the quadrant at any desired degree of throttle opening, and on movement of the lever from position 4 toward position 3 to reduce the engine to idling speed, movement of the lever beyond position 3 toward position 6 is prevented by engagement of the stop 123 with the outer portion of a stop 162 which forms, in connection with a similar stop 163, the detent receiving notch 114 previously described, this arrangement thus serving to definitely determine the idling position of the throttle control mechanism.

In the event the operator is now desirous of releasing fluid pressure from the tire 8 in order to disengage the forward speed clutch, the button 121 is fully depressed in order to cause the latch member 112 to fully clear the member 162, and during movement of the lever between positions 3 and 6, the ball 83 engages the cam portion 95 of the cam slot 84 before the lever reaches position 6, thus lifting the plunger 70 in order to operate the associated valve mechanism to supply fluid pressure to the cylinder 34 through the conduit 36, thus operating the piston 35 to actuate the check valve 29 to release fluid pressure from the tire through the conduit 25 and the associated connections heretofore described. It is necessary, however, to prevent operation of the lever to charge the tire 13 controlling the reverse clutch until fluid pressure is fully discharged from the tire 8, and to this end, the mechanism 40 is so arranged as to prevent the lever from being moved through position 6 to position 1, and thence to position 7 until the above discharging action has occurred. As heretofore stated, the plunger 127 has been moved to upward position during operation of the plunger 69 to charge the tire 8, and on movement of the control lever toward position 6, the upper end of the plunger engages a curvilinear portion 164 of the cam slot 130 which operates in conjunction with the plunger to prevent axial movement of the cam to the left and rotation into position 6 until such time as the plunger is again retracted. This retraction of the plunger is accomplished after a predetermined interval by the application of fluid pressure to the chamber 154 which is charged with fluid pressure through a restricted passage 165 inserted in a conduit 166 which serves to connect conduits 36 and 155, the delaying action being further enhanced by the connection of a volume reservoir 167 with the right end of the conduit 155. Thus on the application of fluid pressure to the conduit 36, the pressure will gradually build up in the chamber 154 sufficiently to move the plunger 127 out of engagement with the cam slot 130, thereby permitting the operator to move the lever to position 6 and to rock the lever to the right from position 6 to position 1 in order to move the cam to the left to its original neutral position.

With the lever thus returned to neutral position, and with fluid pressure exhausted from the tire 8 to completely release the forward clutch, the lever may be moved in a counterclockwise direction from position 1 toward position 7, whereupon the cam portion 96 of the cam slot 86 engages the ball 81 to raise the plunger 68 to operate the associated valve mechanism to supply fluid pressure to conduit 78 and thence to the tire 13 through the conduit 20. At the same time, by virtue of the connection of the lower end of the conduit 78 with the chamber 137, the plunger 125 is moved into engagement with the cam slot 128 against the force exerted by the spring 132 and serves to prevent the complete return of the cam and lever to position 1 until the pressure in the tire 13 has been exhausted sufficiently to disengage the reverse clutch by virtue of the fact that the upper end of the plunger engages a cam portion 168 of the cam slot 128, this portion being so arranged as to permit the cam to be returned toward neutral position sufficiently to move the plunger 71 to exhaust position prior to engagement of the plunger with the portion 168. As soon as the pressure in the tire 13 drops to a value sufficient to permit disengagement of the clutch shoes 14, the plunger 125 is moved downward by the spring 132 in order to permit further movement of the cam and lever into neutral position. Thus the plunger 125 controlled by the pressure supplied to the tire 13 serves to prevent movement of the control lever directly from reverse to forward speed position until such time as the reverse clutch is fully released. As heretofore stated, the throttle controlling shaft 104 operated by the control lever is so connected to the throttle valve of the engine, by means not shown, as to permit movement of the lever between positions 2 and 7 without opening the throttle valve, movement beyond these positions in either direction from neutral position serving to open the throttle valve in order to increase the speed of the engine. Thus when the lever is moved from position 1 to position 7, fluid pressure is supplied to the tire 13, but the engine throttle valve is not opened until the lever is moved beyond position 7 and toward position 8. In order to prevent sudden engagement of the reverse clutch, the choked passage 48 previously described serves to restrict the flow of fluid pressure from the inlet chamber 43 to the inlet chamber 46, the restricted passage 49 between inlet chambers 43 and 47 serving to perform a like function when fluid pressure is being supplied to the forward speed tire 8.

The mechanism 40 comprising the timing plungers 125, 126 and 127 has been described in considerable detail, but this mechanism is not sufficient to insure proper operation of the lever by the operator under all conditions of service, and as heretofore stated there has also been provided a sequence controlling or tracking mechanism 37 which serves to further control the method of operation of the cam which may be followed by the operator. The various parts comprising this mechanism are illustrated more fully in Fig. 9 of the drawing, these parts being located in the unit between a portion 169 of the casing 38 and a cover member 170 adapted to be suitably bolted thereto. These parts include a right follower plate 171 positioned in a bore 172 formed in the casing portion 169 and maintained against rotation by virtue of the engagement of slots 173 with lugs 174 formed on the portion 169, a right locking ring 175 mounted for rotation in the bore 172, a left locking ring 176 mounted for rotation in a similar bore 177 formed in the cover plate 170, and a left follower plate 178 mounted in the bore 177 and maintained against rotation by virtue of the engagement of slots 179 with lugs 180 formed in the cover plate 170. These parts are shown in their proper angular relationship when the control lever is in neutral position, and the locking rings 175 and 176 are adapted to be selectively engaged for purposes to be hereinafter described by lugs 181 formed on the left end of a cylindrical key member 182 which is connected for rotational and axial movement with the cam 80 by means of a suitable pin 183 indicated in Fig. 3. The follower plates 171 and 178 are likewise slidably mounted in the bores 172 and 177, the follower plate 171 being urged to the left with respect to the cam by means of a spring 184 interposed between the left end of the cam and the right end of the follower plate, and the follower plate 178 being normally urged to the right by means of a spring 185 interposed between the end cover 180 and the left face of the plate. As more particularly illustrated in Fig. 1 movement of the locking ring 175 to the right is prevented by means of pins 186 slidably mounted in bores 187, formed in the follower plate 171, the left ends of the pins abutting the right face of the locking ring and the right ends of the pins abutting a shoulder 188 formed on the left end of the casing portion 169. In like manner, movement of the locking ring 176 to the left from the position shown in Fig. 1 is normally prevented by means of pins 189 slidably mounted in bores 190 formed in the locking ring 178 and bores 190a formed in member 179, the right ends of these pins abutting the left face of the locking ring and the left ends normally abutting the right surface of a circular plate 190b, rigidly mounted on the throttle control shaft 104. These pins are normally urged to the right by means of springs 191 mounted between the end of the casing and a shoulder 192 formed on the pins, the shoulder likewise serving to limit movement of the pins to the right with respect to the follower plate in order to provide the proper spacing between the locking ring 176 and the follower plate. With the parts in the position shown, lugs 193 formed on the left face of the follower plate 171 engage slots 194 formed on the locking ring 175 and prevent rotation of the locking ring with respect to the follower ring. Furthermore, rotation of the locking ring 175 in a counterclockwise direction, as viewed from the right end of the unit, is prevented at all times by virtue of the fact that shoulders 195 formed in slots 196 on the locking rings are in engagement with the lugs 174 formed on the casing portion 169, the width of the slots 196 being such that with respect to the lugs 174 that the rings may be rotated in the opposite direction through a predetermined angle under certain conditions of operation. With the control lever in neutral position, the lugs 181 on the key 182, which are of the same thickness as the locking rings 175 and 176, lie in the plane of the ring 176, the result being that lugs 197 formed on the right face of the follower plate 178 are unable to enter slots 198 formed in the locking ring 176 in order to lock the latter against rotation, the plate 178 being maintained axially in the position shown in Fig. 1 in view of the fact that the left faces of the lugs 181 on the key member engage the right face of the lugs 197 on the follower. Rotation of the locking ring 176 in a counterclockwise direction as viewed from the right end of the unit is prevented, as more fully shown in Fig. 8, by engagement of shoulders 199 formed in slots 200 of the ring with the faces of the lugs 180 formed on the cover plate, the width of the slots being such that the locking ring 176 may be rotated through a limited angle in a clockwise direction as viewed from the right end of the unit, further rotation in the latter direction being prevented by the lugs 180. The locking rings 175 and 176 are normally maintained in the neutral positions above described by means of dashpot units 201 interconnected between pins 202 mounted on the ring 175 and pins 203 carried on the ring 176. The construction of these dashpot units is more fully illustrated in Fig. 8, the left unit shown in section comprising a casing 204 having an extension 205 at its lower end interconnected to the pin 203 carried by the ring 176, an upper head portion 206 carried by the casing and having a rod 207 slidably mounted therein and connected to the pin 202 on the ring 175, and a spring 207a interposed between the head portion 206 and a shoulder 208 formed on the lower end of the rod. The right hand unit 201 shown in Fig. 8 is of similar construction, the result being that there is a force exerted tending to draw the pins 202 and 203 together to rotate the rings to such a position that they normally remain in contact with the lugs heretofore described. The connection with the pins 202 and 203 is such as to permit limited universal action.

Assuming that it is now desired to move the control lever from position 1 to position 2, and thence to position 3, it will be understood that the key 182 will be rotated in a clockwise direction, and that the latter may be rotated together with the ring 176 until the left end of the slot 200, as viewed in Fig. 8, engages the lug 180 on the cover. When the key and locking ring have been rotated through this angle, the lugs 181 of the key are in alignment with slots 194 in the locking ring 175 and on movement of the lever from position 2 toward position 3, the lugs 181 of the key engage the lugs 193 of the locking ring 171 and force the latter to the right against the tension of the spring 184 as viewed in Fig. 3. As soon as the key and locking ring have been moved to the right sufficiently, the lugs 181 on the key disengage the slots 198 in the locking ring 176 allowing the latter to spring back to its original position under the action of the units 201 in order to prevent movement of the lever back to position 2 from position 3 except in a manner to be hereinafter described. At the same time, the follower plate 171 is forced to the right out of engagement with the slots 194 of the locking ring 175 and the lugs 181 on the key 182 lie in the plane of the locking ring 175 and may be freely rotated in the slots 194 sufficiently to operate the throttle control mechanism, this corresponding to operation between positions 3 and 4. In the event it is desired to recharge the tire 8 when the lever is between positions 3 and 4, the lever may be rocked to position 5, whereupon the units 201, universally connected to pins 202 and 203, serve as flexible connections between the locking rings 175 and 176 to allow them to be forced apart sufficiently to permit this type of operation. On movement of the control lever from position 3 toward position 6, the locking ring 175 will be rotated in a counterclockwise direction as viewed from the right end of the unit until the ends of the slots 196 engage the lugs 174, whereupon the lugs 181 on the key 182 will be in alignment with the slots 198 in the ring 176 and the lever may be rocked to the right in order to return the latter to position 1. As soon as the lugs 181 disengage the slots 194, the ring 175 springs back to its original position under the action of the units 201, and thus serves to effectively block movement of the cam and key to the right in the event the operator should attempt to return the lever from position 1 directly to position 6. Thus as soon as movement of the lever is initiated from position 1 to position 2, the operator must continue this movement in view of the fact that a return to neutral along this line is prevented by the action of the timing plunger 127, and accordingly moves the lever from position 2 toward position 3, the action of the locking rings serving to prevent the retracing of this movement except by overcoming the spring tension of the units 201 in order to force the rings apart, this action taking place only during the momentary recharging of the forward speed tires on movement of the lever to position 5. The lever may be moved freely between position 3 and position 4, but on movement of the lever from position 3 to position 6, the operator is prevented from returning to position 3 by the timing mechanism heretofore described, and on going from position 6 to position 1, is prevented from retracing this movement by the action of the locking rings in blocking such reverse movement.

In summarizing the action of the above described sequence controlling mechanism, it is pointed out that on movement of the lever from position 1 to position 2, the ring 176 rotates with the key, and rocking movement of the lever toward position 3 with corresponding movement of the cam and key to the right as viewed in Fig. 1 is prevented by the engagement of the right faces of the key lugs 181 with the left face of the ring 175, which is in turn held against movement to the right by means of pins 186 as heretofore described. When the lever reaches position 2, the lugs 181 of the key are in alignment with a portion of the slots 194 in the locking ring 175, consequently permitting the key and cam to be moved to the right. When this occurs, the lugs 181 on the key force the follower ring 171 to the right against a force exerted by the spring 184 until the lugs 181 disengage the slots 198 in the ring 176 and fully engage the slots 194 in the ring 175, at the same time disengaging the lugs 193 on the follower ring from the slots 194 on the locking ring 175 in order to permit the latter to rotate with the key and cam during operation between positions 3 and 6. In the meantime, the ring 176 has snapped back to its original position under the action of the spring unit 201 as soon as the lugs 181 have completely engaged the slots in the ring 175, and thereupon, axial movement of the key and cam to the left is prevented by the engagement of the left face of the lugs 181 with the right face of the ring 176 except when sufficient force is exerted to force the locking rings apart against the force exerted by the spring units 201 in order to momentarily recharge the forward speed tire. During operation of the lever between positions 3 and 4 to control the throttle, the key lugs 181 rotate freely in slots 194 of ring 175. On movement of the lever from position 3 to position 6, the ring 175 is picked up by the key lugs 181 and rotates in a counter-clockwise direction as viewed from the right until the lever reaches position 6, whereupon the lugs 181 are in alignment with a portion of the slots 198 in the ring 176 and the cam and key may be moved to the left when the lever is rocked from position 6 toward position 1. When this action occurs, the lugs 198 of the locking ring 178 are forced out of engagement with the slot 198 in the ring 176, by the motion of the key 182 to the left until such time as the key lugs completely disengage the slots in the ring 175 and fully engage the slots 198 in the ring 176. When this occurs the ring 175 snaps back into its original position to again prevent movement of the lever from position 1 to position 6 and the lugs 193 of the locking ring 171 enter the slots 174 of the right hand locking ring to lock the latter in its original position.

With regard to Fig. 2 of the drawing, it should also be noted that an additional position is also indicated as position 9, and this position is utilized if desired in order to supply fluid pressure simultaneously to both of the tires 8 and 13 in order to lock the transmission in order to prevent rotation of the propeller shaft when the engine is stationary. In some cases, lubrication of the propeller shaft bearings and the reverse mechanism is supplied by a pump driven by the engine, and in the event the vessel is being towed with the engine stationary, the motion of the vessel through the water may cause the propeller shaft to rotate without the bearings being provided with adequate lubrication, and in such case movement of the lever to position 9 will effectively lock the propeller shaft against rotation in view of the fact that both the forward and reverse clutches are engaged at the same time. During this type of operation, the lever is moved from position 3 to position 9, and if desired, a suitable lock, not shown, may be provided in order to normally prevent movement of the lever to this position. During such movement of the lever, the cam 80, is moved further to the right, whereupon the ball 82 engages a cam portion 209 of the cam slot 85 and the ball 81 engages a cam portion 210 of the cam slot 86, the result being that the plungers 68 and 69 are lifted to operate the associated valve mechanisms to supply fluid pressure simultaneously to conduits 79 and 78 with resultant inflation of the tires 8 and 13. When this occurs, fluid pressure is supplied to the chamber 152 below the plunger 127 through conduit 152 connected to conduit 79, and the plunger is forced upward to engage a portion 211 in the cam slot 130 in order to prevent rotation of the cam in either direction. At the same time, fluid pressure is supplied to chamber 137 below the plunger 125 through conduits 78 which force the latter upward to engage a cam slot 212 and the cam slot is so proportioned that on movement of the lever back from position 9 to position 3, complete movement of the lever to this position is prevented by engagement of the plunger 125 with the right end of the slot 212 until the fluid pressure in the tire 13 and in the conduit 78 is exhausted sufficiently to permit complete disengagement of the reverse clutch. When the control lever is fully returned to position 3 from position 9, the reverse speed tire 13 will be substantially fully deflated, while the forward speed tire will be fully inflated, it being noted in this connection that the cam slot 84 is provided with a portion 213 which is adapted to receive the ball 83 during movement of the lever into position 9 in order to prevent operation of the valve mechanism actuated by the plunger 70 to operate the forward speed tire release mechanism.

It is also desirable to prevent operation of the lever to recharge the clutch after discharging of the forward clutch tire has been initiated on movement of the lever from position 3 to position 6 and for this purpose interlocking means are provided for preventing rocking movement of the lever to recharge the tire except when the lever is operating between positions 3 and 4, such interlocking mechanism including the rotating plate 190b which is attached to the shaft 104. Referring to Fig. 6 of the drawing, it will be noted that the plate 190b is provided with elongated slots 214 which are normally out of register with the slidably mounted pins 189 when the control lever is in neutral position. When the control lever is moved to the left as viewed in Fig. 6 from position 1 to position 3, the slots 214 come into register with the ends of the pins 189 to allow the latter to be moved to the left as viewed in Fig. 1, against the action of the spring 191. Assuming that the lever is between positions 3 and 4 and operating along that line, the left faces of the lugs 181 on the key 182 will be in engagement with the right face of the locking ring 176 and movement of the locking ring to the left will be opposed by the spring 191 acting through the pins 189, as well as by the action of spring units 201, but will not serve to prevent movement of the cam and lever to position 5 if the operator so desires in order to operate the valve plunger 69 to recharge the tire 8. In view of the fact that the springs 191 and units 201 urge the locking ring 176 in the opposite direction, however, it is impossible for the operator to leave the lever in position 5 except by deliberate intent, thus preventing the possibility of the transmission being operated over long periods of time with a positive pressure in the casing 26 of the sealing unit 22 and resultant excessive wear on the seals 24.

There has thus been described, in connection with the present invention, novel and efficient means for controlling the operation of a forward and reverse speed transmission having fluid pressure operated clutches, so constituted as to permit complete control of the energization and deenergization of the clutches, as well as operation of the engine throttle, by means of a single operator's control element. Means have been provided for insuring operation of the control element in the proper manner to fully deenergize one clutch prior to energization of the other clutch, and means have also been provided to prevent full speed operation of the vessel in one direction until the clutch serving to engage the engine for moving the vessel in the other direction has been deenergized. By virtue of the novel arrangement of the above referred to means, the proper sequence of operation of the control element is obtained, and abuse of the transmission mechanism by improper operation of the element on the part of the operator is positively prevented, thus permitting the use of relatively unskilled operators on vessels equipped with this particular type of mechanism.

While one embodiment of the invention has been illustrated and described herein with considerable particularity, it is to be expressly understood that the invention is not limited to the form shown but is capable of a variety of expressions. It will be understood that various re-arrangements of the parts may be resorted to and certain elements used with others without departing from the spirit of the invention, as will be readily understood by those skilled in the art. Reference will, therefore, be had to the appended claims for a definition of the limits of the invention.

What is claimed is:

1. Control mechanism for a pair of fluid actuators including valve means for controlling the supply of fluid pressure to each actuator, means including a control element for selectively operating said valve means to supply fluid pressure to either of said actuators, and means controlled by the pressure of fluid supplied to one of said actuators for preventing operation of the valve means by said element to supply fluid pressure to the other actuator except when the pressure of fluid supplied to said one actuator is less than a predetermined value.

2. In a control mechanism having a control element movable longitudinally and laterally along a closed path from a neutral position through a plurality of control positions and back to neutral position, means including a pair of resiliently connected latch members for guiding said element along said path and for preventing operation of said element along said path and through said control positions except in one direction, and locking means associated with said latch means and operable in response to lateral movement of said element for locking said latch means for preventing longitudinal movement of said element during lateral movement thereof.

3. In a control mechanism having a control element movable longitudinally and laterally along a closed path from a neutral position through a plurality of control positions and back to neutral position, means including a pair of resiliently positioned rotatable latch members for guiding said element along said path and for preventing movement of said element along said path and through said control positions except in one direction, and locking means associated with said members and operable during lateral movement of said element to engage one or the other of said members for preventing rotation thereof, whereby longitudinal movement of said element during lateral movement thereof is prevented.

4. In a control valve mechanism having a plurality of control valves, a control element movable longitudinally and laterally along a closed path through a plurality of control positions for selectively controlling the operation of said control valves, a rotatable and laterally movable member connected with the element for operating said valves, means including resiliently biased rotatable latch means associated with said member and cooperating therewith to guide said element along said closed path and to prevent movement of said element along said path through said control positions except in one direction, and locking means associated with said latch means and operable during lateral movement of said member to engage said latch means for preventing rotation of said latch means and member.

5. In a control mechanism having a plurality of fluid pressure control valves, means including a control element movable longitudinally and laterally along a closed path from a neutral position through a plurality of control positions for selectively controlling the operation of said valves, means responsive to the pressure of fluid delivered by said valves for delaying the movement of said element along said path through said control positions, and means including a pair of resiliently biased latch members for preventing movement of said element except along said closed path and for preventing movement of said element along said path through said control positions except in one direction.

6. In a control mechanism having a plurality of fluid pressure control valves, means including a control element movable to a plurality of control positions for selectively operating said valves in a predetermined sequence, and means including resiliently biased latch means cooperating with said element for guiding said element during movement to said control positions and for preventing movement of said element to operate said valves in a reversed sequence.

7. In a control mechanism having a plurality of fluid pressure control valves, means including a control element movable to a plurality of control positions for selectively operating said valves in a predetermined sequence, means including resiliently biased latch means cooperating with said element for guiding the latter during movement to said control positions and for preventing movement of said element to operate said valves in a reversed sequence, and detent means responsive to the pressure of fluid delivered by said valves for delaying the movement of said element through said control positions.

8. In a control mechanism having a plurality of fluid pressure control valves, means including a control element movable to a plurality of positions for selectively operating said valves in a predetermined sequence, means including resiliently biased latch means cooperating with said element for guiding the latter during movement to said control positions and for preventing movement of said element to operate said valves in a reversed sequence, and detent means responsive to the pressure of fluid delivered by one of the valves for delaying movement of the element to operate another of the valves until the pressure of fluid delivered by said one valve exceeds a predetermined value.

9. In a control mechanism having a control element adapted for longitudinal and lateral movement along a closed path from a neutral position through a plurality of control positions, means for guiding said element along said path and for preventing movement of said element along said path through said control positions except in one direction including a pair of movable latch members having neutral positions adapted respectively to engage and move from said neutral positions with the element during longitudinal movement thereof from neutral position in one place and to engage and move with the element during longitudinal movement thereof in the opposite direction in a parallel plane and both adapted to engage the element during lateral movement of the element from the first plane to the second plane along one portion of said path and from the second plane to the first plane along another portion of said path, means for preventing movement of either member and corresponding longitudinal movement of the element whenever both of said members are in engagement with the element, resilient means operable on disengagement of either member from the element for returning that member to neutral position, and means controlled by lateral movement of the element and operable when either member is fully disengaged from the element and returned to neutral position by the operation of said resilient means for locking said disengaged member in said neutral position.

10. In a control mechanism having a control element adapted for longitudinal and lateral movement along a closed path from a neutral position through a plurality of control positions, means for guiding the movement of said element along said path and for preventing movement of said element along said path through said control positions except in one direction including a pair of movable latch members having neutral positions and adapted respectively to be selectively engaged by and moved with the control element during longitudinal movement from neutral position in one plane and during longitudinal movement in the opposite direction in a plane parallel to the first plane, both of said members being adapted to be concurrently engaged by the element during lateral movement of the latter along one portion of said closed path from the first plane to the second plane and along another portion of said closed path from the second plane to the first plane, means carried by each member for selectively engaging the element to substantially prevent lateral movement thereof during engagement of the element with the other member when the element is moving longitudinally in either plane, means for limiting the degree of movement of each member from neutral position for limiting the degree of longitudinal movement of the element when the latter is fully in engagement with either member, resilient means for normally maintaining said members in their neutral positions, and means controlled by lateral movement of said element for locking said members in neutral position when disengaged from the element.

11. The combination with a transmission having a pair of clutches and a pair of fluid actuators for said clutches, of means for controlling the operation of said actuators including a valve for each actuator for controlling the flow of fluid pressure to and from the corresponding actuator, means including a control element for selectively operating said valves, and means responsive to variations of pressure in one of said actuators for preventing operation of the control element to operate one of the valves to supply fluid pressure to the other actuator when the pressure in said one actuator exceeds a predetermined value.

12. The combination with a transmission having a pair of clutches and a power actuator for each clutch, of means for controlling the operation of said actuators including power control means for each actuator for energizing and de-energizing said actuator, means including a control element for selectively operating said power control means for energizing and de-energizing one or the other of said actuators, and means responsive to the power supplied to said actuators for preventing operation of said element and power control means to energize one of the actuators when the degree of energization of the other actuator exceeds a predetermined value.

13. The combination with a transmission having a clutch, a fluid actuator for the clutch, means for supplying fluid pressure to the actuator, and means for normally preventing the release of fluid pressure from the actuator, of means for controlling the operation of said fluid pressure supplying and release preventing means including a control element, means controlled thereby for supplying fluid pressure to the release preventing means in order to effect the release of fluid pressure from the actuator, and means associated with said control element and including means responsive to variations of pressure in the actuator for preventing operation of the latter to supply fluid pressure to the release preventing means until the supply means has been operated to establish a predetermined pressure in the actuator.

14. The combination with an engine having a throttle, a transmission having a clutch, a fluid actuator for the clutch, a control element for controlling the operation of the clutch and throttle, and a connection between said element and throttle, of means controlled by the operation of said element for supplying fluid pressure to said actuator for effecting engagement of the clutch, and fluid pressure responsive means separate from said actuator and controlled by the fluid pressure supplied thereto for preventing throttle controlling movement of said control element until the pressure supplied to said actuator exceeds a predetermined value.

15. The combination with an engine having a throttle, a transmission for the engine, a clutch in the transmission, a fluid actuator for the clutch, an element for controlling the operation of the throttle, and means for connecting the element and throttle whereby the element is movable in one range to control the actuator and in another range to control the operation of the throttle, of means including a control valve for controlling the supply of fluid pressure to said actuator, means for effecting an operating connection between said control valve and element, and fluid pressure operated means separate from said actuator and responsive to the fluid pressure supplied to said actuator for preventing movement of said element into the throttle operating range except when the pressure supplied to said actuator exceeds a predetermined value.

16. The combination with a transmission having a clutch, a brake, a fluid pressure actuator for the clutch, a fluid pressure actuator for the brake, and fluid pressure operated releasing means for normally preventing the release of fluid pressure from the clutch actuator, of means for controlling the supply of fluid pressure to said actuator including a control element, control valves operated by the element for selectively supplying fluid pressure to the clutch actuator, brake actuator, and releasing means, and means responsive to variations in the pressure supplied to said clutch actuator, releasing means and brake actuator for preventing operation of said element and control valves to supply fluid pressure to said releasing means prior to the supplying of a predetermined pressure to the clutch actuator, and for preventing operation of said element and control valves to supply fluid pressure to the brake actuator except when the pressure in the clutch actuator has been reduced below a predetermined value by the operation of said releasing means.

17. The combination with a transmission having a pair of clutches for controlling the transmission, a fluid pressure actuator for controlling one of the clutches, a second fluid pressure actuator for controlling the other clutch, means for normally preventing the release of fluid pressure from said second actuator, and fluid pressure operated means for operating said preventing means for releasing fluid pressure from said second actuator, of means for controlling the supply of fluid pressure to said actuators and fluid pressure operated means including a control element, valvular means controlled thereby for selectively energizing said actuators and fluid pressure operated means, and means including means responsive to the pressure in said second actuator and cooperating with said element when the second actuator is energized by operation of the valvular means for insuring operation of the valvular means to energize the fluid pressure operated means prior to operation of the valvular means to energize the first named actuator.

18. The combination with a transmission having a pair of clutches for controlling the transmission, a fluid pressure actuator for controlling one of the clutches, a second fluid pressure actuator for controlling the other clutch, means for normally preventing the release of fluid pressure from said second actuator, and a fluid motor for operating said preventing means to release fluid pressure from the second actuator, of means for controlling the supply of fluid pressure to said actuators and motor including a valve for controlling the supply of fluid pressure to each actuator, a valve for controlling the supply of fluid pressure to the motor, means including a control element movable in one direction to operate one of said valves to supply fluid pressure to the second actuator and movable in another direction to operate another of said valves to supply fluid pressure to the first named actuator, and means cooperating with said element when the latter is moved in the first named direction for preventing movement of the latter in the other direction to operate the valve for controlling the supply of fluid pressure to the first named actuator prior to operation of the valve for controlling the supply of fluid pressure to the motor.

19. The combination with a fluid pressure actuator and a second fluid pressure actuator having means for retaining fluid pressure therein and a fluid motor for operating said retaining means to release fluid pressure therefrom, of means for selectively controlling the supply of fluid pressure to said actuators and motor and for preventing the supplying of fluid pressure to either one of said actuators when the pressure in the other one of said actuators exceeds a predetermined value including a control valve for each actuator, a control valve for the motor, a control element for selectively operating said valve, and means cooperating with said control element and controlled by the pressures in the actuators and motor for preventing valve operating movement of said element to supply fluid pressure to one of the actuators when the pressure of fluid supplied to the other actuator exceeds a predetermined value.

20. The combination with a fluid pressure actuator and a second fluid pressure actuator having means for retaining fluid pressure therein and a fluid motor for operating said retaining means to release fluid pressure therefrom, of means for selectively controlling the supply of fluid pressure to said actuators and motor and for preventing the supplying of fluid pressure to one of said actuators when the pressure in the other of said actuators exceeds a predetermined value including a control valve for each actuator, a control valve for the motor, a control element for selectively operating said valves, means cooperating with said control element and controlled by the pressures in the actuators and motor for permitting or preventing valve operating movement of said element in accordance with variations in pressure in said actuators and motor, and other means cooperating with said element for insuring sequential operation thereby of the control valve for the second actuator and the motor control valve in the order named whenever the element is moved to operate the control valve for the second actuator.

21. The combination with a fluid pressure actuator, a second fluid pressure actuator having means for retaining fluid pressure therein, and a fluid motor for operating said retaining means to release fluid pressure therefrom, of means for selectively controlling the supply of fluid pressure to said actuators and motor and for preventing the supplying of fluid pressure to one of said actuators when the pressure in the other of said actuators exceeds a predetermined value including a control valve for each actuator, a control valve for the motor, a control element for selectively operating said valves, means cooperating with said control element and controlled by the pressures in the actuators and motor for permitting or preventing valve operating movement of said element in accordance with variations in pressure in said actuators and motor, means cooperating with said control element for insuring sequential operation thereby of the control valve for the second actuator and the motor control valve in the order named, and means for preventing operation of the control valve for the first actuator after operation of the control valve for the second actuator to supply fluid pressure thereto except after operation of the motor control valve.

22. The combination with a transmission having a pair of clutches for controlling the operation of the transmission, an actuator for each clutch, an engine for driving the transmission having a throttle for controlling the speed of the engine, and a control element having a connection with the throttle and movable in an idling range and in a throttle operating range for opening the throttle and increasing the speed of the engine, of means controlled by the movement of said element in one direction for energizing one of said actuators and by movement thereof in another direction for energizing the other actuator, means for preventing movement of said element in said throttle operating range in said one direction prior to energization of said one actuator to a predetermined degree by the operation of said energizing means, means operable on movement of said element from the throttle operating range to said idling range for insuring de-energization of said actuators, and means for preventing energization of either of said actuators by the operation of said element and energizing means when the other of said actuators is energized in excess of a predetermined degree.

23. The combination with a transmission having a clutch, a power actuator for the clutch, means for energizing the actuator, means for de-energizing the actuator, a motor for operating said de-energizing means, an engine for driving said transmission, and a throttle for controlling the speed of the engine, of means for controlling the operation of said energizing means, motor and throttle including a control element connected with the throttle having a neutral position, a clutch actuator energizing position, a slow engine speed position, a full engine speed position, and a clutch actuator de-energizing position, means controlled by operation of said element from said neutral to said energizing position for supplying power to said actuator and controlled by movement of said element from said energizing position to said low speed position for preventing the further supply of power to said actuator, means responsive to the power supplied to said actuator for preventing reverse movement of said element from said slow speed position to said neutral position through said energizing position, and for preventing movement of the element to said full speed position until said actuator is energized, means controlled by movement of said element from said slow speed position to said release position for supplying power to the motor in order to effect de-energization of said actuator, and latch means associated with said element for insuring sequential operation of said element from said neutral position through said energizing, slow speed and de-energizing positions, and for preventing movement of said element from neutral position, through said de-energizing position, said slow speed position, and said energizing position.

24. The combination with a transmission having a clutch, a fluid actuator for the clutch, means for normally retaining fluid pressure in the clutch, and a motor for operating the retaining means to release fluid pressure from the clutch, of a source of fluid pressure, means for sequentially connecting the source of fluid pressure with the actuator, dis-connecting the source of fluid pressure from the actuator, connecting the source of fluid pressure with the motor and dis-connecting the source of fluid pressure from the motor including a control element, valve means operated by the element for connecting and disconnecting the source from the actuator, valve means operated by the element for connecting and disconnecting the source from the motor, and latch means associated with said element for insuring the operation of said element in said sequence.

25. The combination with a transmission having a clutch, a fluid actuator for the clutch, and means including a motor for releasing fluid pressure from the actuator, of a source of fluid pressure, means for sequentially connecting the source with the actuator, dis-connecting the source from the actuator, connecting the source with the motor and dis-connecting the source from the motor including a control valve having connections with the source and actuator, a control valve having connections with the source and motor, means including a control element for operating said valves, means responsive to pressure supplied to said actuator for preventing movement of said element to operate the control valve to supply fluid pressure to the motor when the pressure of fluid supplied to the actuator is less than a predetermined value, and latch mechanism associated with the element for insuring said sequential operation.

26. The combination with a transmission having a clutch, a fluid actuator for the clutch, means for normally retaining fluid pressure in the actuator, a motor for operating said retaining means to release fluid pressure from the actuator, and a source of fluid pressure, of means for sequentially connecting the source and actuator, dis-connecting the source and actuator, connecting the source and motor, and disconnecting the source and motor including a control element, valvular means controlled by operations of said element for sequentially controlling the connection between said source and actuator and between said source and motor, and resiliently biased latch means associated with said element and controlled by movement thereof for insuring operation of the element to accomplish said sequential operation.

27. In a control mechanism for a transmission of the type having a forward speed fluid actuator, means including a motor for releasing fluid pressure from said actuator, and a reverse speed fluid pressure actuator, means for controlling the pressure of fluid supplied to said actuators including a casing having a control valve for each actuator and a control valve for said motor, a longitudinally and laterally movable control element, a cam member connected with said element and mounted in the casing for rotation during longitudinal movement of said element and for axial movement during lateral movement of said element for selectively controlling the operation of said valves, detent means responsive to the pressure of fluid supplied to said actuators and motor for controlling the movement of the cam member by said element and for preventing operation of the valves by movement of the element and cam to supply fluid pressure to either one of said actuators when the pressure supplied to the other one of said actuators exceeds a predetermined value, and means including resiliently biased latch means carried by the casing and cooperating with said cam for insuring operation of the element and cam to operate the control valve for the first named actuator and the control valve for the motor in the order named and for preventing operation thereof in the reverse order.

28. In a control mechanism for a power plant of the type having an engine provided with a speed control, a transmission provided with a clutch, a fluid actuator for controlling the supply of fluid pressure to the clutch, and means including a fluid motor for controlling the release of fluid pressure from the actuator, a casing having a control valve for the actuator and a control valve for the motor, a control element having a connection with the engine speed control and operable longitudinally and laterally in one range for controlling the valves and longitudinally in another range for controlling the speed control of the engine, a cam member connected with the element for rotation during longitudinal movement thereof and axial movement during lateral movement of the element for sequentially operating said valves in the order named, means associated with said cam for preventing movement thereof to operate said valves in the opposite sequence, interlocking means for permitting axial movement of the cam member to operate the first named valve to supply fluid pressure to the actuator when the element is in the speed control range, and resilient biasing means for opposing said axial movement of the cam when the element is operating in the speed control range.

29. In a control mechanism for a transmission having a forward speed clutch actuator, a reverse speed clutch actuator, and means including a fluid motor for controlling the release of fluid pressure from the first named actuator, a casing having a control valve for each actuator and a control valve for the motor, a control element movable longitudinally and laterally for selectively controlling the operation of said valves, and means including a cam connected with said element for operating said valves, said cam being adapted during longitudinal movement of the element in one plane to rotate to selectively operate the control valves for the actuators, during longitudinal movement of the element in another plane to rotate to operate the motor control valve, during lateral movement of the element between the two planes to move axially to selectively operate either actuator control valve, and during lateral movement of the element beyond the second plane to operate both actuator control valves concurrently to supply fluid pressure to both actuators.

30. The combination with a control element adapted to move from a neutral position through a plurality of control positions longitudinally in opposite directions along parallel sides of said closed path and laterally in opposite directions between the ends of said parallel sides, of means for guiding said element along said path and for preventing reverse movement of said element along said path through said control positions including a latch member engaged by and movable from a neutral position with said element during movement of said element along one side of said path and adapted to be dis-engaged by the element on lateral movement of the latter toward the other side of said path, a second latch member engaged by and movable from a neutral position with the element in the opposite direction along the other side of said path and adapted to be disengaged by the element on lateral movement of the latter toward the first named side of said path, and resilient means associated with said latch members for returning them to their respective neutral positions when disengaged by the element in order to prevent reverse lateral movement of the element along said path.

31. The combination with a control element adapted to move from a neutral position through a plurality of control positions longitudinally in opposite directions along parallel sides of said closed path and laterally in opposite directions between the ends of said parallel sides, of means for guiding said element along said path and for preventing reverse movement of said element along said path through said control positions including a latch member engaged by and movable from a neutral position with said element during movement of said element along one side of said path and adapted to be dis-engaged by the element on lateral movement of the latter toward the other side of said path, a second latch member engaged by and movable from a neutral position with the element in the opposite direction along the other side of said path and adapted to be dis-engaged by the element on lateral movement of the latter toward the first named side of said path, resilient means associated with said latch members for returning them to their respective neutral positions when dis-engaged by the element in order to prevent reverse lateral movement of the element along said path, and means including locking means controlled by lateral movement of the element for locking said members in neutral position except when fully engaged by the element in order to prevent longitudinal movement of said element during lateral movement thereof between said parallel sides.

32. The combination with an engine having a speed control, a transmission having a clutch, a control element for controlling the operation of the speed control and clutch, and a connection between the element and speed control, of means controlled by the operation of the element for supplying fluid pressure to the actuator for controlling engagement of the clutch, and fluid pressure responsive means separate from said actuator and controlled by the fluid pressure supplied thereto for preventing movement of the element to operate the speed control until the clutch has been fully engaged in response to operation of the first named means and actuator.

FREDERICK F. ROHRER, Jr.

REFERENCES CITED

The following references are of record in the file of this patent:

UNITED STATES PATENTS

| Number | Name | Date |
|---|---|---|
| 2,286,873 | Schwartz | June 16, 1942 |
| 2,358,846 | Andres | Sept. 26, 1944 |
| 2,366,020 | Good | Dec. 26, 1944 |

FOREIGN PATENTS

| Number | Country | Date |
|---|---|---|
| 429,213 | Great Britain | May 27, 1935 |